UNITED STATES PATENT OFFICE.

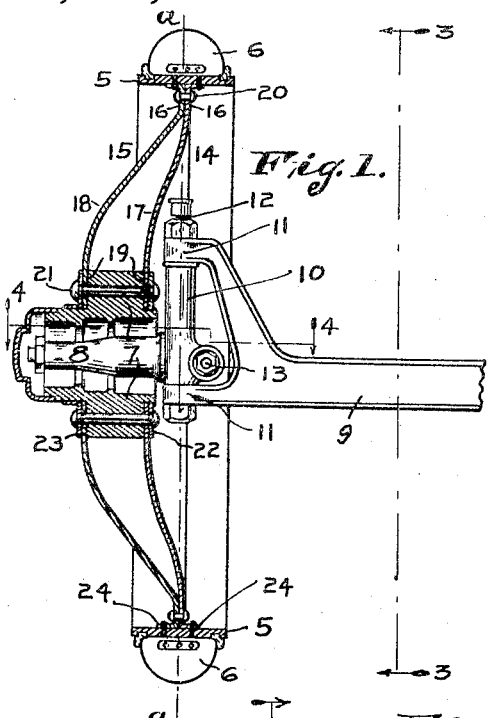
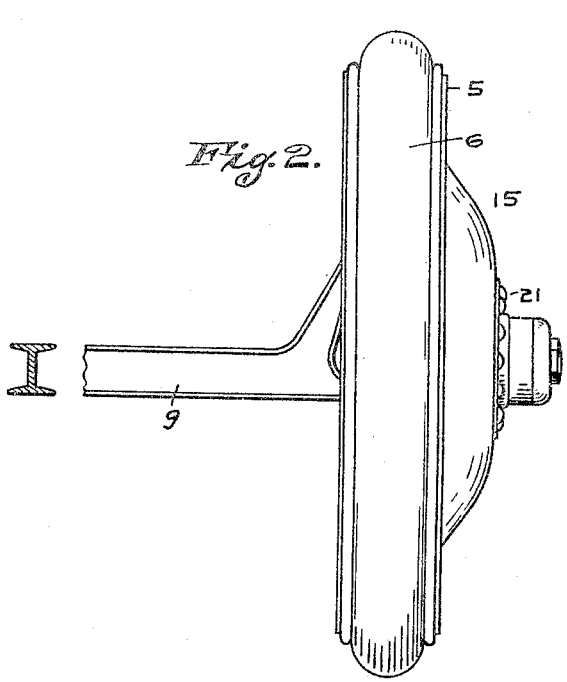
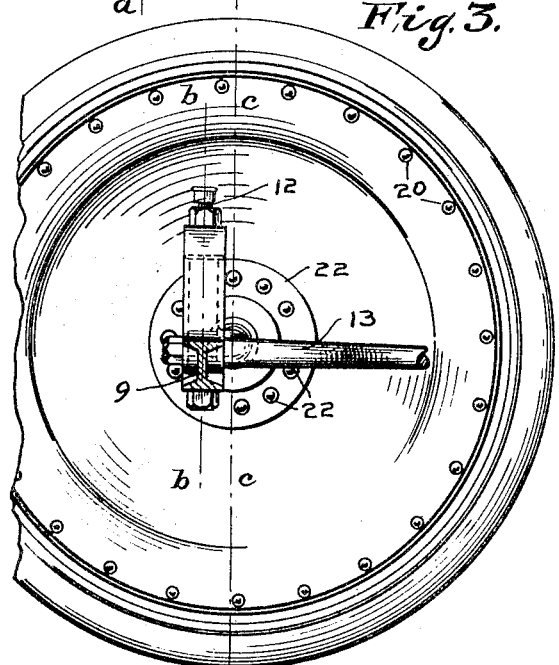
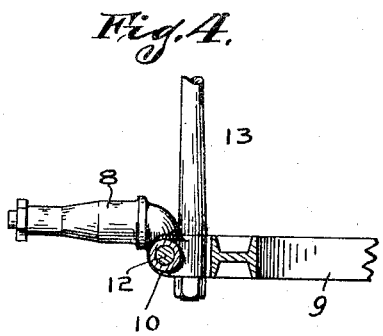

ALFRED M. LOFLAND, OF LEBANON, INDIANA.

CASTER-WHEEL.

1,111,845.  Specification of Letters Patent.  Patented Sept. 29, 1914.

Application filed September 5, 1912.  Serial No. 718,706.

*To all whom it may concern:*

Be it known that I, ALFRED M. LOFLAND, a citizen of the United States, residing at Lebanon, in the county of Boone and State of Indiana, have invented certain new and useful Improvements in Caster-Wheels, of which the following is a specification.

This invention relates to improvements in the steering wheels of motor vehicles.

The object of the invention is to provide an inexpensive, strong and light sheet metal wheel so constructed that the pivot of the steering knuckle may be located in the plane of the wheel intermediate the opposite sides of the rim to permit of the free turning or sluing of the wheel.

A further object is to locate the wheel axle sufficiently to the rear of the vertical pivot of the knuckle to secure a caster action of the wheel whereby in case of accident to the steering mechanism the wheels will run straight ahead instead of eccentrically as would otherwise be likely to occur.

I accomplish the objects of my invention by the mechanism illustrated in the accompanying drawings, which form a part of this specification, in which similar characters of reference indicate like parts in the several figures.

Figure 1 is a vertical section through a wheel constructed in accordance with my invention. Fig. 2 is a front elevation of the wheel on the other end of the axle constructed in acordance with my invention. Fig. 3 is a section on the line 3—3 of Fig. 1, showing the wheel in elevation as viewed from its inner side, and Fig. 4 is a horizontal section on the line 4—4 of Fig. 1 looking down.

My improved wheel includes a rim 5 of any suitable construction to which a suitable tire 6 is secured. The construction of tire and rim and the manner of securing the tire to the rim form no part of my invention and may be any approved construction.

Located at the center of the wheel is a hub 7 which is adapted to be mounted on the spindle 8 of the axle of the vehicle. The hub 7 is of any suitable character, and is here shown of a form to receive roller bearings between it and the spindle 8. The bearings however are not shown, but the places for them are illustrated in Fig. 1. The body 9 of the axle is connected to the spindle 8 by a suitable steering knuckle comprising upper and lower journals 11 on the body of the axle, and a sleeve 10 on the spindle and rotatable about a vertical pivot bolt 12 passing through sleeve 10 and journals 11. As shown in Figs. 3 and 4, the axis of the spindle 8 is in a vertical plane considerably to the rear of the plane passing through the axis of the bolt 12. The vertical plane through the axis of the spindle is illustrated by the dotted line *c—c* in Fig. 3 and the axis of the bolt 12 by the dotted line *b—b* in said Fig. 3. This is an important feature of my invention as it secures a caster action of the wheel causing the latter, when the pivot of the steering knuckle also lies in a plane intermediate the opposite sides of the rim of the wheel, to run straight ahead should there be any accident to the steering mechanism. The extension lever to the steering mechanism is shown at 13.

One of the important features of my invention involves the peculiar construction of the wheel whereby its hub 7 is supported from the rim 5 to one side of the plane intermediate the opposite sides of the rim to permit the axis of the steering knuckle,— that is, of bolt 12, to lie in this intermediate plane, as shown by the dotted line *a—a* of Fig. 1. This support between rim 5 and hub 7 comprises a pair of sheet metal disks 14 and 15 each of which has an annular outer portion 16, lying in a plane parallel with and intermediate the sides of the rim, and outwardly bent portions 17 and 18 which each merge into planes parallel with each other and at right angles to the axis of the hub, as shown at 19. The outward dish of the disk 15 is considerably greater than that of the inner disk 14, as shown in Fig. 1, so that they brace and support each other. The contacting members 16 are bolted together by rivets 20, and the separated members 19 receive annular extensions of the hub 7 between them, and they are secured to said extensions by rivets 21. An inner annular plate 22 is placed between the disk 14 and the rivet heads, and an annular angle plate 23 is placed between the outer rivet heads and the disk 15. These plates 22 and 23 materially strengthen the attachment of the disks to the hub. The outer edges of both disks 14 and 15 are bent outwardly at right angles to form a flange 24, the two flanges together constituting a seat for the rim 5.

The described formation of the two disks 14 and 15 may be secured in any known manner or by any known means of forming and shaping metal, but they are most easily and cheaply produced by pressing them from thin metal plates or disks by means of suitably-formed dies. The parts once formed are readily and quickly assembled with the hub by bringing them together into their proper relative positions and permanently and rigidly uniting them by the transverse rivets, after which the rim 5 may be slipped over the periphery 24 and united thereto by any suitable means. A wheel thus constructed is to a large extent hollow and of comparatively light weight, and by the braced and trussed relation of the two disks when assembled and riveted the wheel possesses a high degree of strength and rigidity and resistance to the deforming strains, and at the same time the hub 7 is located at one side of the wheel and outside of the intermediate plane between the sides of the rim so as to allow the pivotal axis of the knuckle to be located in said intermediate plane, and by thus locating the steering knuckle above the point of support and somewhat in advance of it the frictional resistance with the ground is reduced to a minimum and a normal tendency of the wheels to travel in a straight line is secured.

While I have described my invention with more or less minuteness as regards details of construction and arrangement and as being embodied in certain precise forms I do not desire to be limited thereto unduly or any more than is pointed out in the claims. On the contrary, I contemplate all proper changes in form, construction and arrangement, the omission of immaterial elements and the substitution of equivalents as circumstances may suggest or necessity render expedient.

I claim:—

1. In a wheel, the combination with a hub and a rim, of a pair of sheet metal disks both extending from the rim to the hub and secured to and connecting said members, the connection with the rim being approximately within the middle plane of the wheel, both of said disks being curved from rim to hub outwardly to form an outwardly dished wheel, the outer disk having more dish than the inner one.

2. In a wheel dished outwardly to receive the pivot of a steering-knuckle and caster-acting support in a plane through the middle of the wheel, the combination of a hub, a rim, a pair of sheet metal disks each having annular outer portions which are in contact with each other and are in planes at right angles to the axis of the hub, said disks having inner portions separated by an annular hub extension and said disks also having intermediate outwardly and continuously curved portions connecting said rim and hub to form an outwardly dished wheel, the outer disk having more dish than the inner disk, the outer edges of said disks being flanged in opposite outer directions to receive the rim of the wheel, and means connecting the flanges with said rim.

3. In a wheel dished outwardly to receive the pivot of a steering-knuckle and caster-acting support in a plane through the middle of the wheel, the combination, of a hub, a rim, a pair of sheet metal disks each having annular outer portions which are in contact with each other and are in planes at right angles to the axis of the hub, said disks having inner portions parallel with each other but separated by an annular hub extension, said disks having intermediate outwardly curved portions connecting said rim and hub portions to form an outwardly dished wheel, the outer disk having more dish than the inner disk, the outer edges of said disks being flanged in opposite outer directions to receive the rim of the wheel, and rivets securing the contacting portions of the disks together.

In witness whereof, I, have hereunto set my hand and seal at Indianapolis, Indiana, this 13th day of Aug., A. D. one thousand nine hundred and twelve.

ALFRED M. LOFLAND. [L. S.]

Witnesses:
F. W. WOERNER,
L. B. WOERNER.